(12) United States Patent
Nakajima et al.

(10) Patent No.: US 7,855,874 B2
(45) Date of Patent: Dec. 21, 2010

(54) BATTERY UNIT

(75) Inventors: Yuji Nakajima, Tokyo (JP); Yasuyuki Horii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 16 days.

(21) Appl. No.: 12/237,279

(22) Filed: Sep. 24, 2008

(65) Prior Publication Data

US 2009/0009939 A1 Jan. 8, 2009

Related U.S. Application Data

(63) Continuation of application No. 11/404,616, filed on Apr. 14, 2006, now abandoned.

(30) Foreign Application Priority Data

Apr. 18, 2005 (JP) ............................. 2005-119831

(51) Int. Cl.
*H05K 7/14* (2006.01)

(52) U.S. Cl. ..................... 361/679.02; 361/679.09; 361/679.08; 361/679.26; 248/917

(58) Field of Classification Search ............ 361/679.02, 361/679.08, 679.09, 679.26; 248/917–924
See application file for complete search history.

(56) References Cited

U.S. PATENT DOCUMENTS

| | | | |
|---|---|---|---|
| 4,772,990 A | | 9/1988 | Linehan et al. |
| 5,272,598 A | | 12/1993 | Kobayashi |
| 5,459,388 A | * | 10/1995 | Illingworth et al. ............. 429/7 |
| 5,475,626 A | * | 12/1995 | Viletto .................... 361/679.55 |
| 5,582,389 A | | 12/1996 | Greene |
| 5,583,744 A | | 12/1996 | Oguchi et al. |
| 6,078,496 A | | 6/2000 | Oguchi et al. |
| 6,159,632 A | | 12/2000 | Osawa |
| 6,224,996 B1 | * | 5/2001 | Bovio et al. .................... 429/99 |
| 6,521,371 B1 | | 2/2003 | Lavanture |
| 6,560,100 B1 | | 5/2003 | Shin et al. |
| 6,617,063 B1 | * | 9/2003 | Ohnishi ......................... 429/7 |

(Continued)

FOREIGN PATENT DOCUMENTS

JP 05-205712 8/1993

(Continued)

OTHER PUBLICATIONS

United States Office Action dated Dec. 12, 2007 for U.S. Appl. No. 11/404,616, filed on Apr. 14, 2006 entitled Battery Unit.

(Continued)

*Primary Examiner*—Jayprakash N Gandhi
*Assistant Examiner*—Ingrid Wright
(74) *Attorney, Agent, or Firm*—Blakely, Sokoloff, Taylor & Zafman LLP

(57) ABSTRACT

According to one embodiment, a battery unit comprises a plurality of battery cells; and a casing having an upper and lower walls. The casing comprises a first portion that stores at least one battery cell; a second portion that stores at least one battery cell; and a third portion that connects the first portion and the second portion to each other. The third portion is at least partially formed to be thinner than the first and second portions. The third portion has therein a rib extending between the upper wall and lower walls.

17 Claims, 16 Drawing Sheets

U.S. PATENT DOCUMENTS

| | | |
|---|---|---|
| 6,811,921 B2 | 11/2004 | Dansui et al. |
| 6,884,540 B2 * | 4/2005 | Chikada ..................... 429/99 |
| 2003/0198845 A1 | 10/2003 | Nakanishi et al. |
| 2005/0069739 A1 | 3/2005 | Ozeki |
| 2006/0210869 A1 * | 9/2006 | Takeguchi et al. ........... 429/153 |

FOREIGN PATENT DOCUMENTS

| | | |
|---|---|---|
| JP | 2001-143673 | 5/2001 |
| JP | 2002-091616 | 3/2002 |

OTHER PUBLICATIONS

United States Office Action dated Jun. 11, 2008 for U.S. Appl. No. 11/404,616, filed on Apr. 14, 2006 entitled Battery Unit.

* cited by examiner

BATTERY UNIT

CROSS-REFERENCE TO RELATED APPLICATIONS

This application is a continuation application of U.S. patent application Ser. No. 11/404,616, filed Apr. 14, 2006, now abandoned, which is based upon and claims the benefit of priority from Japanese Patent Application No. 2005-119831, filed Apr. 18, 2005, the entire contents of which are incorporated herein by reference.

BACKGROUND

1. Field

One embodiment of the present invention relates to a battery unit capable of being mounted in an electronic apparatus such as a portable computer, etc.

2. Description of the Related Art

A portable computer (notebook personal computer) includes a battery unit mounted therein. The battery unit mounted in the portable computer has a plurality of battery cells and is shaped like a rectangle with a predetermined thickness. It is disclosed by, for example, JP-A-2001-143673 that a battery unit includes an extension portion overlapping with a thin portion of an expansion unit vertically. In the rectangular battery unit with a predetermined thickness, the portion overlapping with the thin portion of the extension unit vertically is notched to thereby form the extension portion. A board is stored in the inside of the extension portion Nowadays, further reduction in thickness is required of an electronic apparatus such as a portable computer.

BRIEF DESCRIPTION OF THE SEVERAL VIEWS OF THE DRAWINGS

A general architecture that implements the various feature of the invention will now be described with reference to the drawings. The drawings and the associated descriptions TO are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a battery unit comprises a plurality of battery cells; and a casing having an upper and lower walls. The casing comprises a first portion that stores at least one battery cell; a second portion that stores at least one battery cell; and a third portion that connects the first portion and the second portion to each other. The third portion is at least partially formed to be thinner than the first and second portions. The third portion has therein a rib extending between the upper wall and lower walls.

Figure 1:
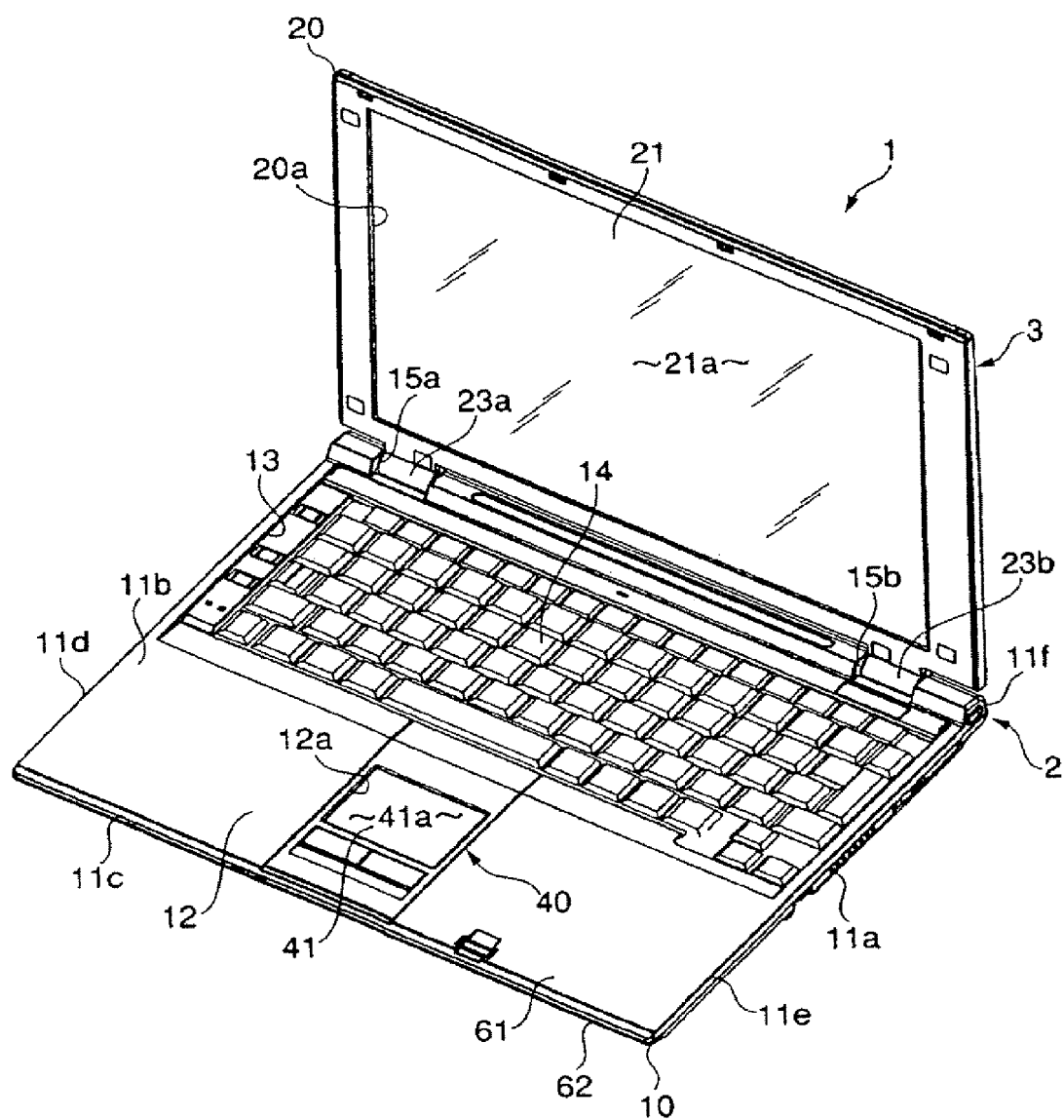
FIG. 1 is a perspective view of a portable computer according to a first embodiment.
Figure 2:
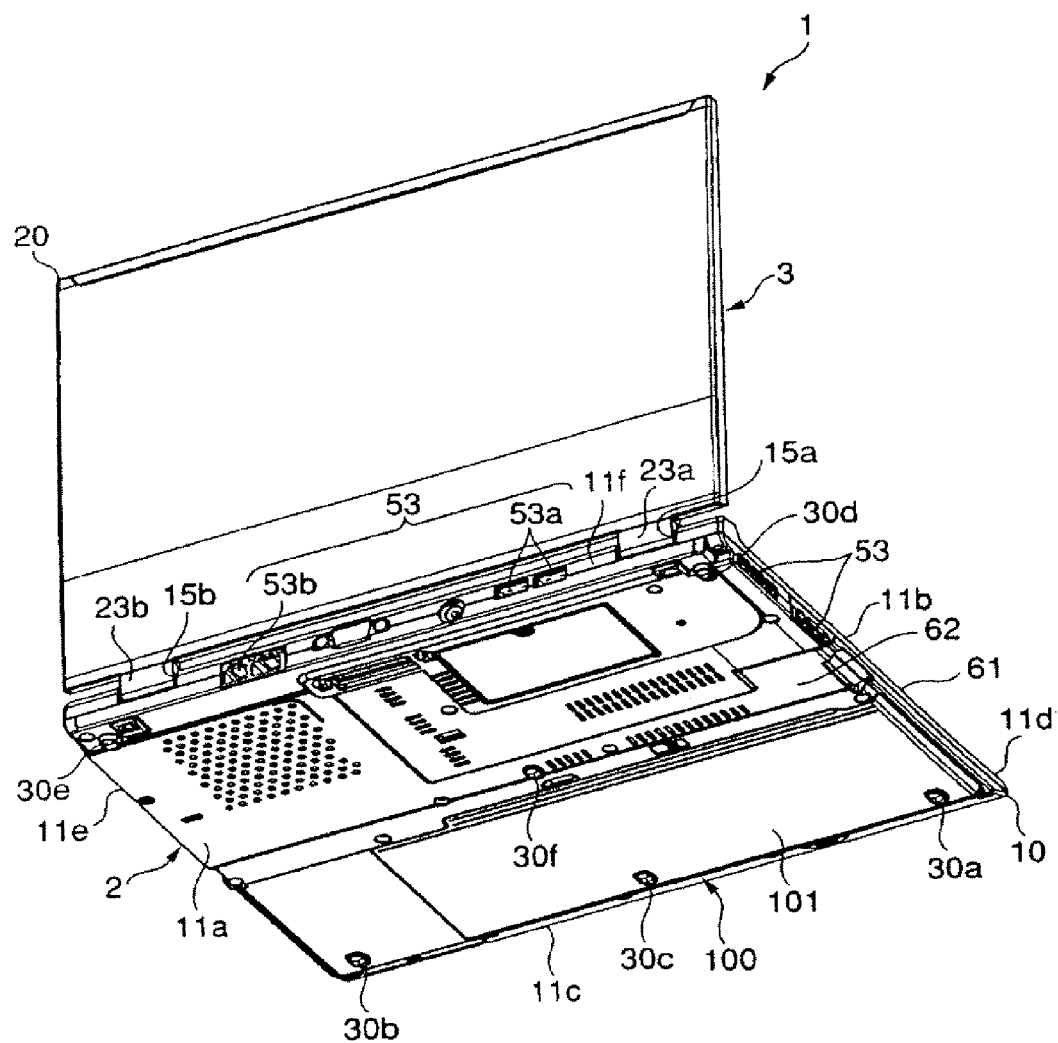
FIG. 2 is a perspective view showing a state in which a battery unit has been mounted in the portable computer depicted in FIG. 1.
Figure 3:
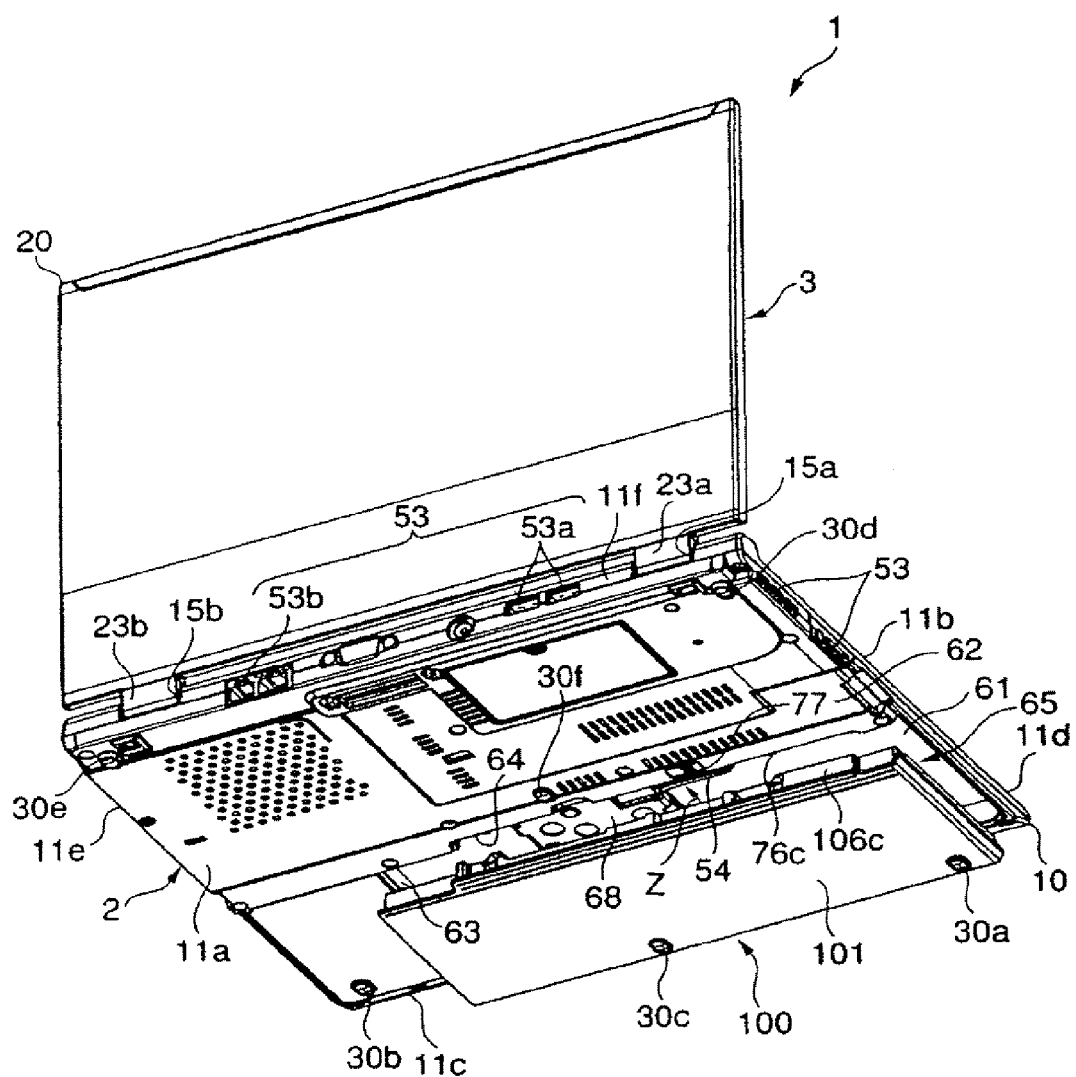
FIG. 3 is an exploded perspective view showing a state in which the battery unit depicted in FIG. 2 has been removed from the portable computer depicted FIG. 1.

According to a first embodiment will be described below with reference to FIGS. 1 to 13. The embodiment is shown as an example in which a battery unit is mounted in an electronic apparatus such as a portable computer. FIGS. 1 to 3 show a portable computer 1 as the electronic apparatus. The portable computer 1 includes a body unit 2, and a display unit 3.

As shown in FIG. 1, the body unit 2 has a first housing 10 shaped like a flat box. The first housing 10 has a bottom wall 11a, a top wall 11b, a front wall 11k left and right side walls 11d and 11e, and a rear wall 11f. An outer surface of the top wall 11b has a palm rest 12 on a near side (front side).

The top wall 11b of the first housing 10 has a keyboard attachment portion 13 in the rear of the palm rest 12. A keyboard 14 used for inputting numbers, characters, etc. is attached to the keyboard attachment portion 13.

The first housing 10 has a pair of coupling recess a portions 15a and 15b in its rear end portion. The coupling recess portions 15a and 15b are made of depressed regions opened to the front, lower and rear sides of the first housing 10. The coupling recess portions 15a and 15b are provided separately from each other in a widthwise direction (left-right direction) of the body unit 2.

The display unit 3 includes a second housing 20, and a liquid crystal panel 21 serving as a display panel. The liquid crystal panel 21 is received in the inside of the second housing 20. The liquid crystal panel 21 has a screen 21a for displaying an image. An opening portion 20a for exposing the screen 21a is provided in the second housing 20. The screen 21a is exposed to the outside of the second housing 20 through the opening portion 20a.

The second housing 20 has a pair of coupling leg portions 23a and 23b at its one end portion. The coupling leg portions 23a and 23b are disposed separately from each other in the widthwise direction of the second housing 20 so as to be led into the coupling recess portions 15a and 15b of the first housing 10, respectively. The coupling leg portions 23a and 23b are supported by the coupling recess portions 15a and 15b so that the coupling leg portions 15a and 15b can rotate through hinge fittings (not shown) respectively.

With this configuration, the display unit 3 can rotate between a close position and an open position. In the close position, the display unit 3 is laid horizontally on the body unit 2 so as to cover the palm rest 12, the keyboard 14, etc. from above. In the open position, the display unit 3 is provided erectly with respect to the body unit 2 to expose the palm rest 12, the keyboard 14, the screen 21a, etc.

A pointing device (see FIGS. 1, 6, 7, 10 and 11) 40, a hard disk drive (hereinafter abbreviated to "HDD", see FIGS. 6 and 7) 50, a printed-wiring board (see FIGS. 10 and 11) 52, etc. as electronic components are received in the inside of the first housing 10. Moreover, the first housing 10 has a battery unit (battery pack, see FIGS. 2, 3, 6 and 7) 100.

Specifically, the first housing 10 is formed to have a first member 61 and a second member 62 as shown in FIGS. 3, 4, 6, 8 and 10. The first and second members 61 and 62 are formed of a metal material such as a magnesium alloy. The first member 61 forms the top wall 11b, the front wall 11c, the left and right side walls 11d and 11e and the rear wall 11f of the first housing 10. The second member 62 forms a part of the bottom wall 11a of the first housing 10.

The second member 62 has a first partition wall 63 and a second partition wall 64 which rise upward. The inside of the first housing 10 is partitioned into first, second and third storage portions 65, 66 and 67 by the first and second partition walls 63 and 64. The first partition wall 63 is provided between the first and second storage portions 65 and 66. The second partition wall 64 is provided between the first and third storage portions 65 and 67.

Moreover, the second member 62 has a pointing device support portion 68 as a mechanical component in the inside of the first storage portion 65. The pointing device support portion 68 is overhung horizontally from a rising end portion of the second partition wall 64. The pointing device support portion 68 is expanded downwards (see FIG. 10). Incidentally, the pointing device support portion 68 may be formed of the first member 61 instead.

The first storage portion 65 is provided under the palm rest 12 so as to extend in the widthwise direction of the first housing 10. The first storage portion 65 is formed of a recess opened to the lower side of the first housing 10. The second storage portion 66 is provided in a position near to the side wall 11e side so as to be arranged side by side with the first storage portion 65 in the widthwise direction. The third storage portion 67 is provided under the keyboard 14, that is, in the rear of the first and second storage portions 65 and 66.

As shown in FIG. 1, the first housing 10 has a pointing device 40 such as a touch pad in the center portion of the palm rest 12. As shown in FIGS. 6, 7, 10 and 11, the pointing device 40 has an input portion 41, and a drive device 42. One surface (upper surface) of the input portion 41 serves as a flat input surface 41a. The input portion 41 is supported by a frame-like support member 43. The drive device 42 is received in the inside of the first storage portion 65 which is the inside of the first housing 10, in the condition that the drive device 42 is supported by the pointing device support portion 68.

An opening portion 12a is provided in the center portion of the palm rest 12 in the top wall 11b of the first housing 10 to expose the input surface 41a. As shown in FIG. 1, the input surface 41a of the pointing device 40 is exposed to the outside of the first housing 10 through the opening portion 12a.

Any one selected from a sheet for sensing capacitance, a pressure-sensitive film for sensing pressure, and so on, may be used as the input portion 41 of the pointing device 40. Moreover, the pointing device 40 may be provided so that information can be input through the top wall 11b. On this occasion, the opening portion 12a can be omitted.

Incidentally, the pointing device 40 is inevitably provided in the central portion of the palm rest 12 in the portable computer 1. If the pointing device 40 is displaced from the center portion of the palm rest 12, the location of the pointing device 40 is not good because not only is it difficult to use the pointing device 40 but also the pointing device 40 becomes an obstacle to the operation of the keyboard 14.

Figure 6:
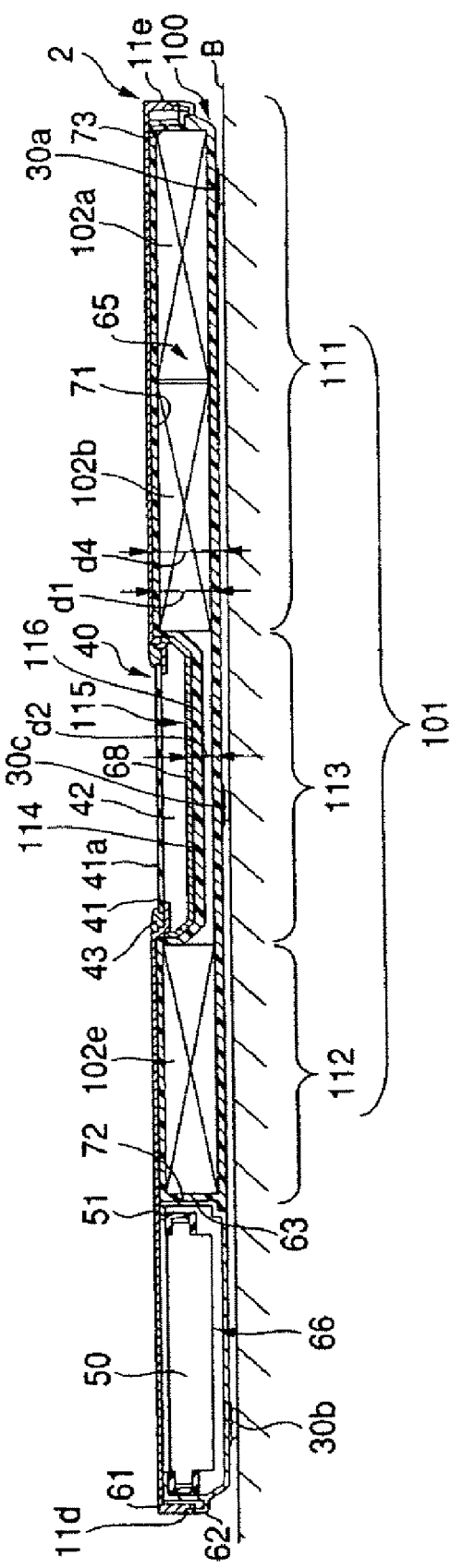
FIG. 6 is a sectional view taken along the line VI-VI in FIG. 5.
Figure 7:
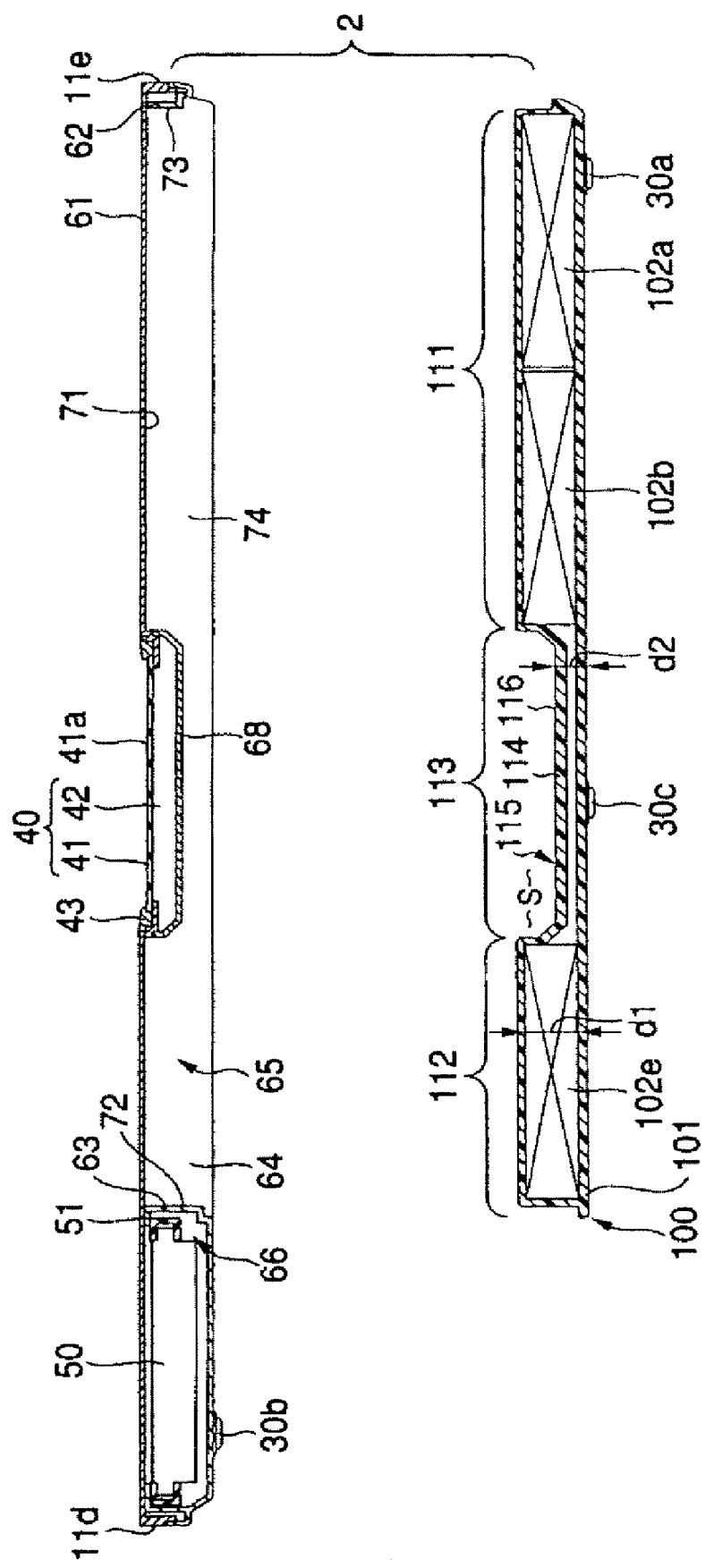
FIG. 7 is a sectional view like FIG. 6, showing a state in which the battery unit depicted in FIG. 2 has been removed from the portable computer depicted in FIG. 1.

As shown in FIGS. 6 and 7, the HDD 50 is provided under the palm rest 12 and near to the side wall 11e side. While supported by an HDD support member 51, the HDD 50 is stored in the inside of the second storage portion 66 which is the inside of the first housing 10. The HDD support member 51 is screwed to the first housing 10.

Figure 10:
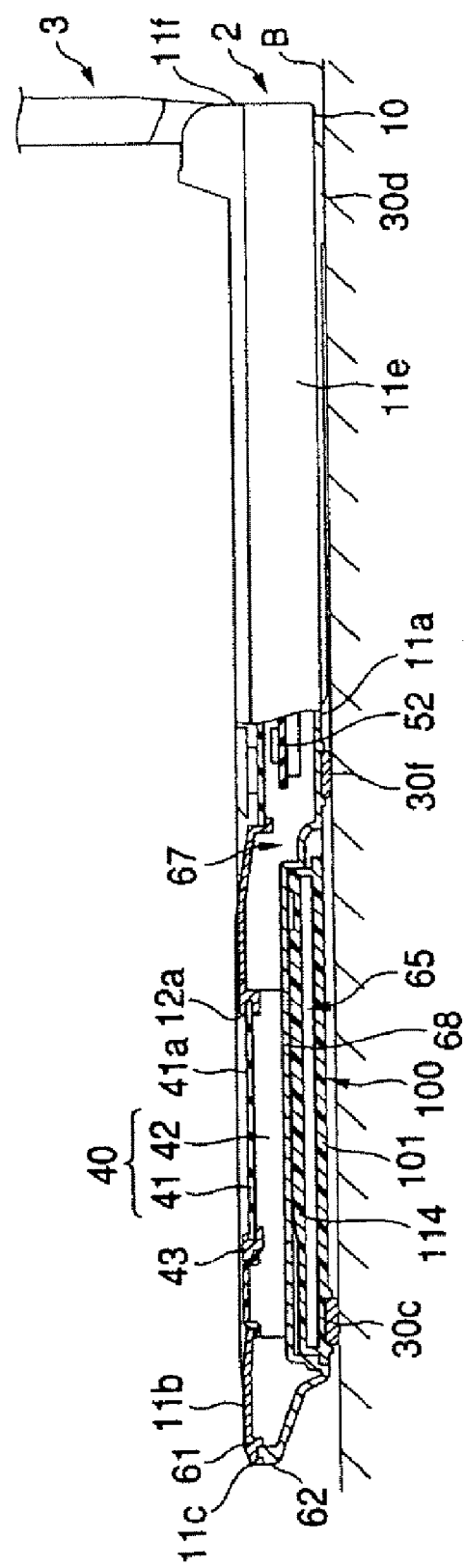
FIG. 10 is a sectional view taken along the line X-X in FIG. 5.
Figure 11:
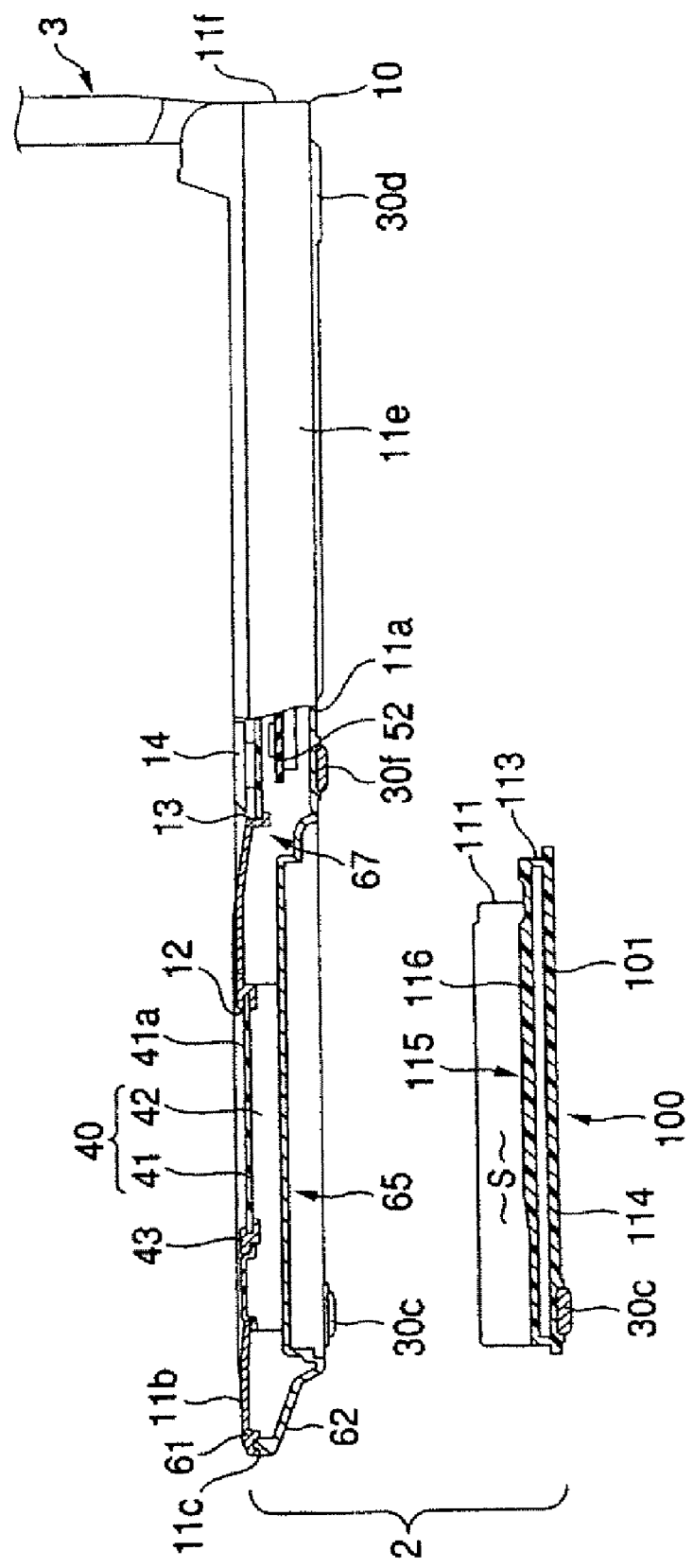
FIG. 11 is a sectional view like FIG. 10, showing a state in which the battery unit depicted in FIG. 2 has been removed from the portable computer depicted in FIG. 1.

As shown in FIGS. 10 and 11, the printed-wiring board 52 is provided below the keyboard 14. That is, the printed-wiring board 52 is stored in the inside of the third to storage portion 67. The printed-wiring board 52 is screwed to the first housing 10. Incidentally, when the first housing 10 has a PC card slot into which a PC card is inserted, the PC card slot may be provided in the second storage portion 66 while the HDD 50 is provided in the third storage portion 67.

Although not shown, a connector panel is mounted in the inside of the third storage portion 67 which is the inside of the first housing 10. The connector panel has connectors 53 such as USB connectors 53a, an LAN connector 53b, etc. As shown in FIGS. 2 and 3, these connectors 53 are exposed to the outside through the rear wall 11f and the side wall 11d. These connectors 53 are electrically connected to the printed-wiring board 52.

As shown in FIGS. 2 and 3, the battery unit 100 is provided under the palm rest 12 and side by wide with the HDD 50 in the widthwise direction. The battery unit 100 is fit into the first storage portion 65 to form a part of the bottom wall 11a of the first housing 10.

As described above, the pointing device 40 is provided approximately in the center portion of the palm rest 12. Accordingly, a part of the battery unit 100 overlaps with the pointing device 40 (pointing device support portion 68) in the thickness direction (vertical direction). Due to this overlapping part, the battery unit 100 according to this embodiment has a relief portion 115 and is formed to have an external shape substantially identical to the shape of the first storage portion 65.

Specifically, the first storage portion 65 is defined by a bottom surface 71 and a pair of rising end surfaces 72 and 73 and a pair of rising side surfaces 74 and 75 rising from the bottom surface 71. The bottom surface 71 is defined by the inner surface of the palm rest 12 and the lower surface of the pointing device support portion 68. That is, the bottom surface 71 is defined by the inner surface of the first member 61 and the outer surface of the second member 62. The portion of the bottom surface 71 where the pointing device support portion 68 is provided is overhung downward with respect to the inner surface of the first member 61.

One 72 of the pair of rising end surfaces 72 and 73 is one of a pair of end surfaces of the first partition wall 63 on the first storage portion 65 side. The other rising end surface 73 is the inner surface of the side wall 11d. One 74 of the pair of rising side surfaces 74 and 75 is one of a pair of end surfaces of the second partition wall 64 on the first storage portion 65 side. The other rising side surface 75 is the inner surface of the front wall 11C.

As shown in FIGS. 6, 7, 12, and 13, the battery unit 100 includes a casing 101 made of an insulating member such as synthetic resin, a plurality of battery cells (storage battery portions) 102a to 102f, and a board 103. So-called square cells each having a flat box-like external shape can be used as the battery cells 102a to 102f. Incidentally, so-called round cells each having a cylindrical external shape may be used as the battery cells 102a to 102f instead. The battery cells 102a to 102f are secondary batteries respectively.

Figure 4:
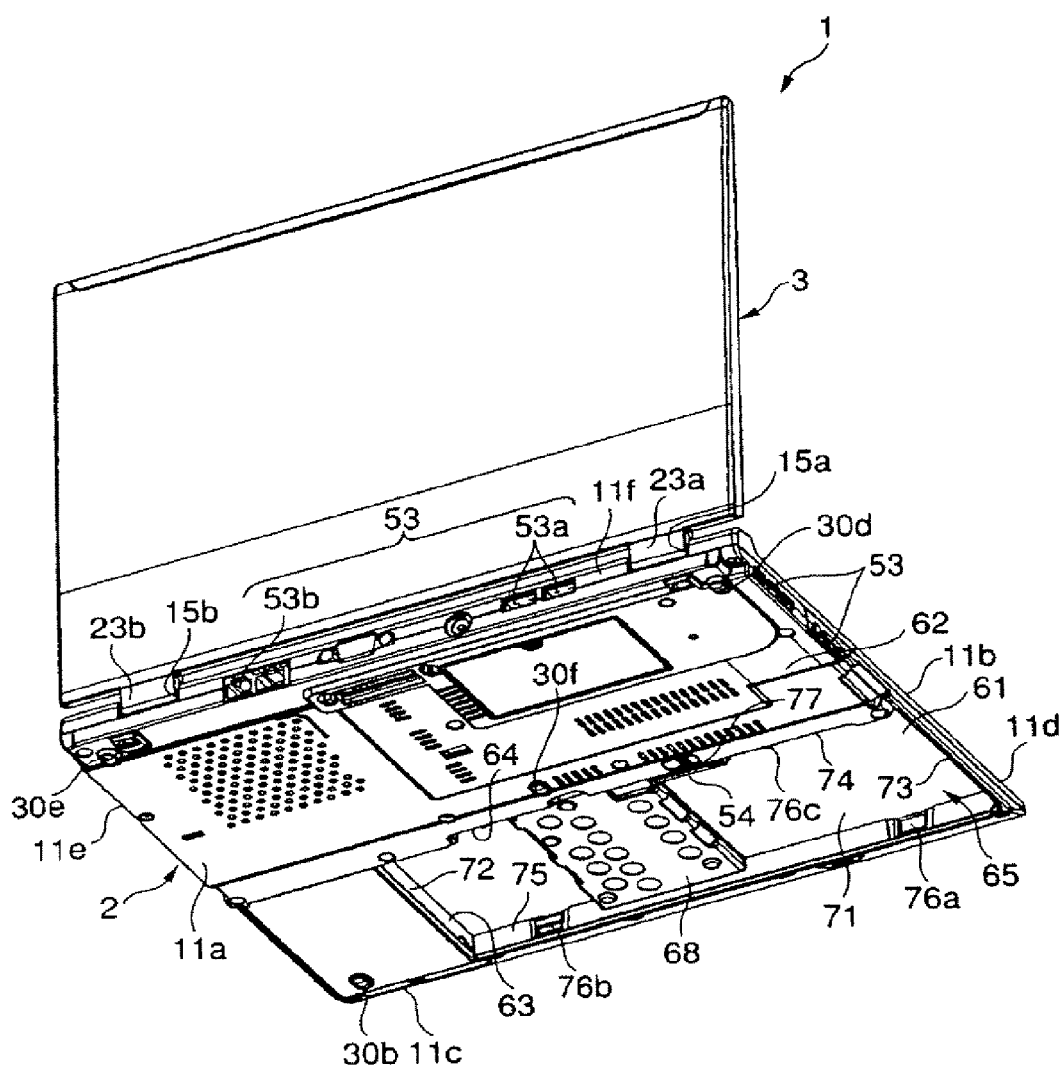
FIG. 4 is a perspective view showing a state in which the battery unit depicted in FIG. 2 has been removed from the portable computer depicted in FIG. 1.
Figure 13:
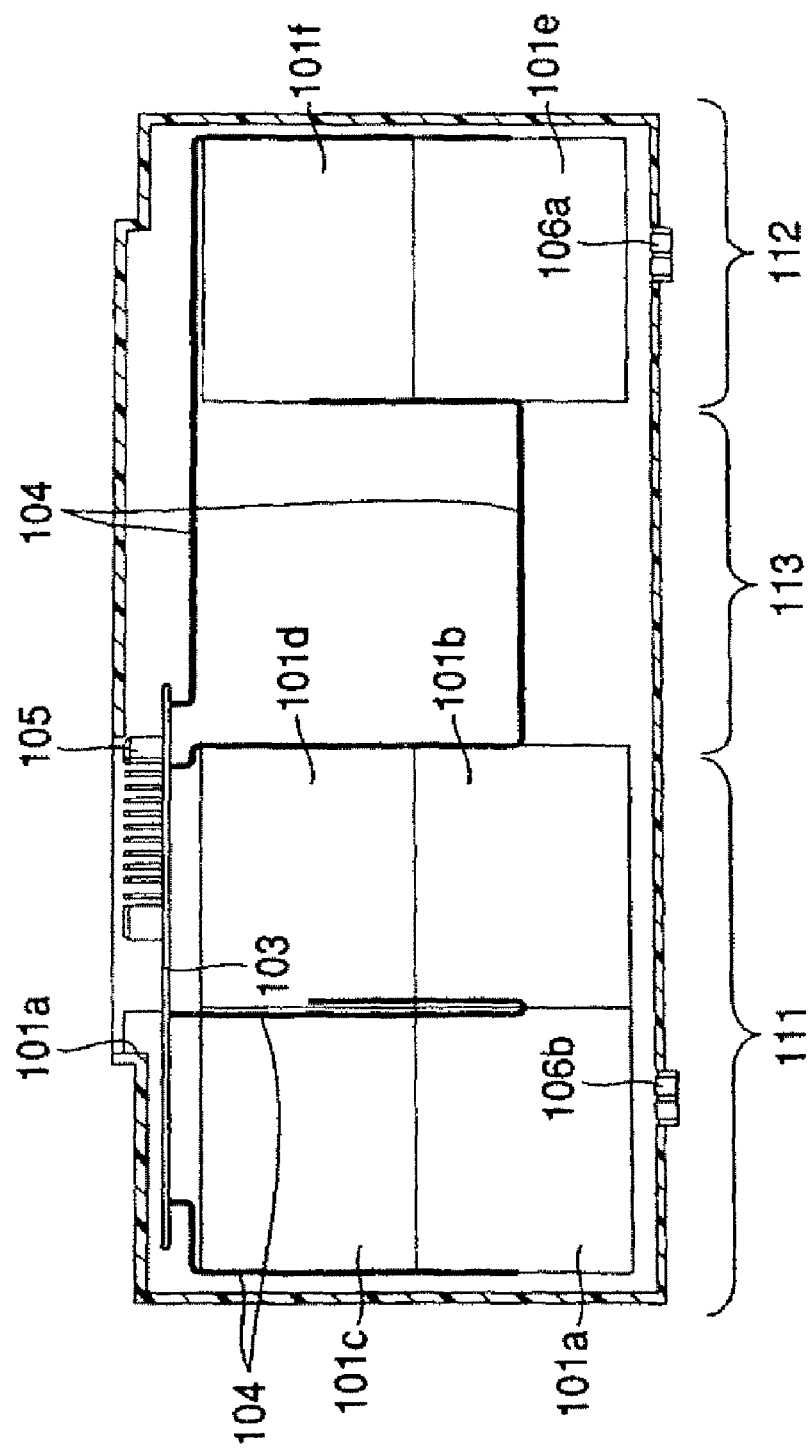
FIG. 13 is a cross-sectional view showing the battery unit depicted in FIG. 2.

As shown in FIGS. 4 and 13, the casing 101 has a first portion 111 for storing one or more battery cells, e.g. four battery cells 102a to 120d, a second portion 112 for storing one or more battery cells, e.g. two battery cells 102e and 120f, and a third portion 113 for connecting the first portion 111 and the second portion 112 to each other. That is, in the battery unit 100, the portion where the battery cells 102a to 102f are stored is partitioned into parts while the parts are kept electrically connected to each other.

Plus and minus electrodes of the four battery cells 102a to 102d stored in the first storage portion 65 are electrically connected to the board 103 through wirings (e.g. thin plates) 104. Similarly, plus and minus electrodes of the two battery cells 102e and 102f stored in the second storage portion 66 are electrically connected to the board 103 through wirings (e.g. thin plates) 104. Accordingly, the battery unit 100 has a so-called 3S (3-series) 2P (2-parallel) structure.

There is also an electrical resistance component in each of the battery cells 102a to 102f per se. For this reason, electrical balance of the battery unit 100 as a whole can be adjusted, for example, by changing the thicknesses (resistances) of the wirings 104 for electrically connecting the battery cells 102a to 102f to one another.

The third portion 113 has the relief portion 115 in a portion overlapping with the pointing device 40 as an electronic component (pointing device support portion 68 as a mechanical component) to avoid the pointing device 40 (pointing device support portion 68 as a mechanical component). In the battery unit 100 according to this embodiment, the relief portion 115 is formed so as to be thinner than each of the first and second portions 111 and 112. In other words, the relief portion 115 has a thin portion 114 which is thinner than each of the first and second portions 111 and 112. As shown in FIG. 7, the thickness d2 of the thin portion 114 is formed to be smaller than the thickness d1 of each of the battery cells 102a to 102f. Moreover, the thickness d2 of the thin portion 114 is formed to be smaller than the thickness d4 of each of the first and second portions 111 and 112.

For example, the relief portion 115 (thin portion 114) can be achieved by provision of a recess portion (groove portion) 116 in an end surface which is one (upper) of the upper and lower end surfaces of the casing 101 and which faces the pointing device support portion 68. In the battery unit 100, the casing 101 is formed so that the thickness (i.e. thickness of the thin portion 114) d2 of a bottom 116a of the recess portion 116 is thinner than the thickness d1 of each of the battery cells 102a to 102f. Incidentally, the other end surface (which is a lower surface opposite to the upper surface facing the pointing device support portion 68) of the casing 101 is provided as a flat rectangular surface.

As shown in FIG. 13, a connector 105 allowed to be connected to a power connector 54 is provided in the board 103. The board 103 is stored in the inside of the casing 101 in parallel to the thickness direction of the battery unit 100 (so as to be perpendicular to the flat end surface (lower surface) of the casing 101). For example, the board 103 and the connector 105 are provided in the first portion 111.

(Rear) one of the pair of side surfaces of the casing 101 has an opening portion 101a. The connector 105 is exposed to the outside through the opening portion 101a. Incidentally, the board 103 and the connector 105 may be provided in the second portion 112 or the third portion 113. Moreover, the board 103 and the connector 105 may be provided in different portions of the first to third portions 111 to 113.

Figure 12:
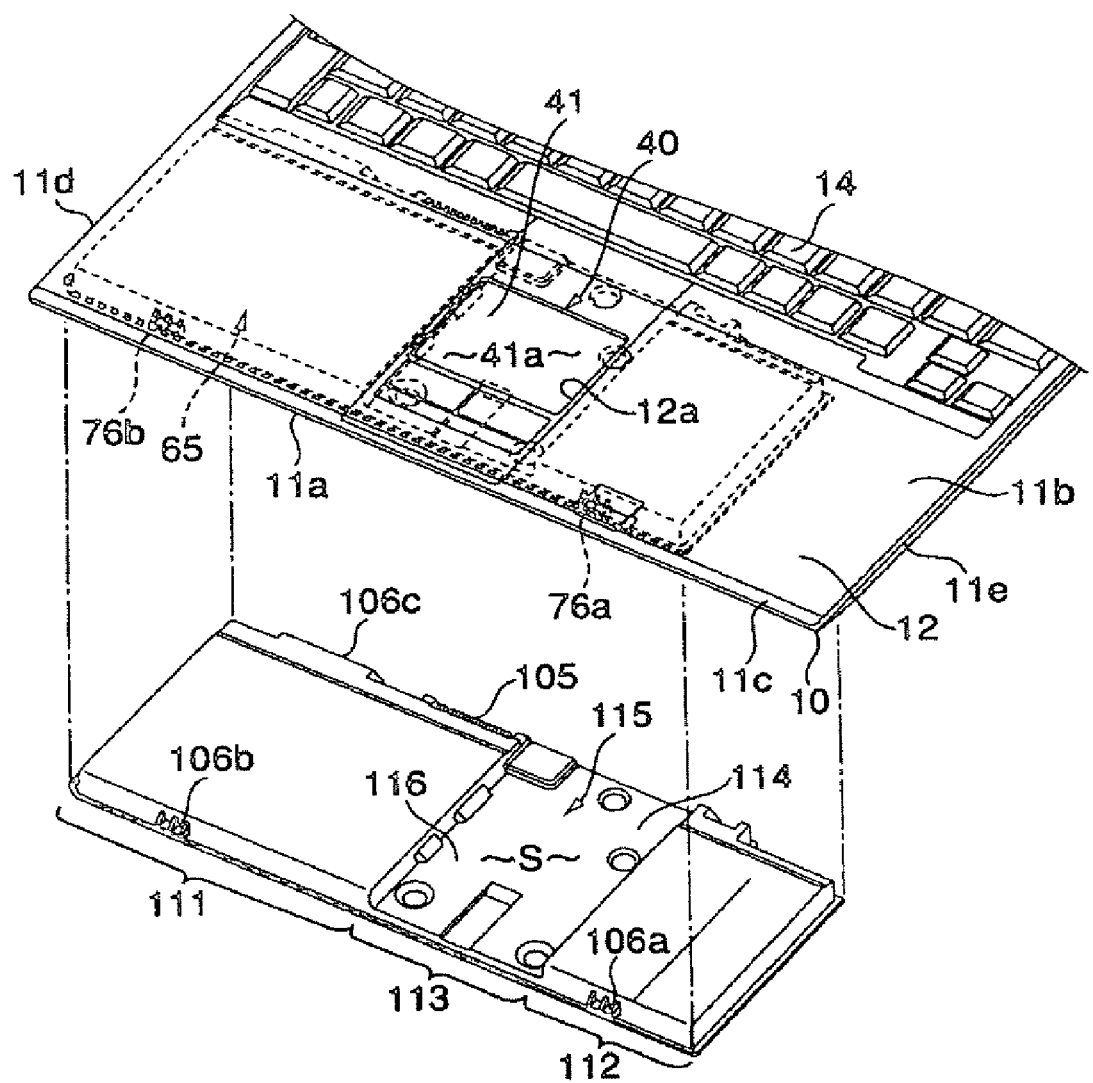
FIG. 12 is an exploded perspective view showing a state in which the battery unit depicted in FIG. 2 has been removed from the portable computer depicted in FIG. 1.

As shown in FIG. 3, an engagement portions 101c is provided in (rear) one of the pair of side surfaces of the casing 101. As shown in FIG. 12, a pair of engagement portions 106a and 106b are provided in the other (front) one of the pair of side surfaces of the casing 101. The engagement portions 106a and 106b are separate from each other in the lengthwise direction of the casing 101.

On the other hand, as shown in FIG. 4, an extension portion not shown extends from the printed-wiring board 52. The power connector 54 is attached to a front end portion of the extension portion. The power connector 54 can be electrically connected to the connector 105 of the battery unit 100. The power connector 54 is exposed from the one rising side surface 74 of the first storage portion 65.

As shown in FIG. 3, an engagement bearing portion 76c to be engaged with an engagement portion 106c is provided in the rising side surface 74 of the first storage portion 65. The engagement bearing portion 76c is interlocked with a release lever 77 exposed to the outside of the first housing 10 so as to be movable in the widthwise direction of the first housing 10. Moreover, as shown in FIGS. 4 and 12, a pair of engagement bearing portions 76a and 76b to be engaged with the engagement portions 106a and 106b are provided in the other rising side surface 75 of the first storage portion 65.

The battery unit 100 can be removably mounted in the first storage portion 65. When the portable computer 1 is used in a place where no commercial power source is not available, the battery unit 100 serves as a drive power source. The weight of the battery unit 100 occupies a relatively large part of the whole weight of the portable computer 1.

The battery unit 100 is stored in the first storage portion 65 as represented by the arrow Z in FIG. 3 while inclined obliquely in the condition that the rear wall 11f of the first housing 10 is faced up so that the connector 105 faces the power connector 54. Thus, the upper surface of the battery unit 100 is made near to the bottom surface 71 of the first storage portion 65, so that the battery unit 100 is stored in the first storage portion 65. In this manner, the engagement portions 106a and 106b are engaged with the engagement bearing portions 76a and 76b while the engagement portion 106c is engaged with the engagement bearing portion 76c, so that the battery unit 100 is mounted in the first housing 10. At the same time, the connector 105 of the battery unit 100 is electrically connected to the power connector 54. In addition, the battery unit 100 is stored in the first storage portion 65 so that the thin portion 114 as the relief portion 115 overlaps with the pointing device 40 as an electronic component (pointing device support portion 68 as a mechanical component).

As described above, the outer shape of the battery unit (shape of the casing 101) is substantially identical to that of the first storage portion 65. Accordingly, the lower surface of the casing 101 is substantially located on one and the same plane as the outer surface of the bottom wall 11a of the first housing 10. To this end, a wall which is one of the walls of the casing 101 and which is opposite to the wall facing the pointing device support portion 68 forms a part of the bottom wall 11a of the first housing 10.

When the battery unit 100 is stored in the first storage portion 65 of the first housing 10, the battery unit 100 is mounted in the first housing 10 so that at least a part (almost the whole in this embodiment) of the pointing device 40 as an electronic component (pointing device support portion 68 as a mechanical component) overlaps with the thin portion 114 in the thickness direction of the first housing 10 (in a direction perpendicular to an installation surface of the portable computer 1).

To remove the battery unit 100 from the first housing 10, the release lever 77 can be slid. When the release lever 77 is slid, the engagement bearing portion 76c is also slid correspondingly. Thus, the engagement portion 106c of the battery unit 100 is disengaged from the engagement bearing portion 76c. In this manner, since the rear end portion of the battery unit 100 is floated up from the first housing 10, fingers can be put on the rear end portion of the battery unit 100 to remove the battery unit 100 from the first housing 10 (first storage portion 65).

When configuration is made as described above, the thickness of the first housing 10 can be reduced by the thickness of the bottom wall 11a, compared with the case where the battery unit 100 is formed in the region put between the bottom and top walls 11a and 11b of the first housing 10. In addition, the thickness of the first housing 10 can be reduced further by the thickness of the pointing device 40, compared with the case where the background-art battery unit with a flat outer shape is stored in the inside of the first housing 10 in the condition that the battery unit overlaps with the pointing device 40.

Moreover, the electric capacity of the battery unit 100 can be made to be substantially equal to that of the background-art battery unit 100 having the 3S 2P structure and having a flat outer shape. The outer surface of the battery unit 100 is hidden while facing the installation surface such as a worktop B where the portable computer 1 is installed. Accordingly, the portable computer 1 looks nice because the battery unit 100 is not exposed to the outside in a normal use condition.

The battery unit 100 is formed so that the outer surface (lower surface) of the casing 101 of the battery unit 100 and the outer surface of the bottom wall 11a of the first housing 10 are substantially on one and the same plane. With this configuration, when leg portions 30a to 30f are provided in the outer surface of the casing 101 of the battery unit 100 and the outer surface of the bottom wall 11a of the first housing 10, the portable computer 1 can be fixed on the installation surface such as the worktop B stably.

Figure 5:
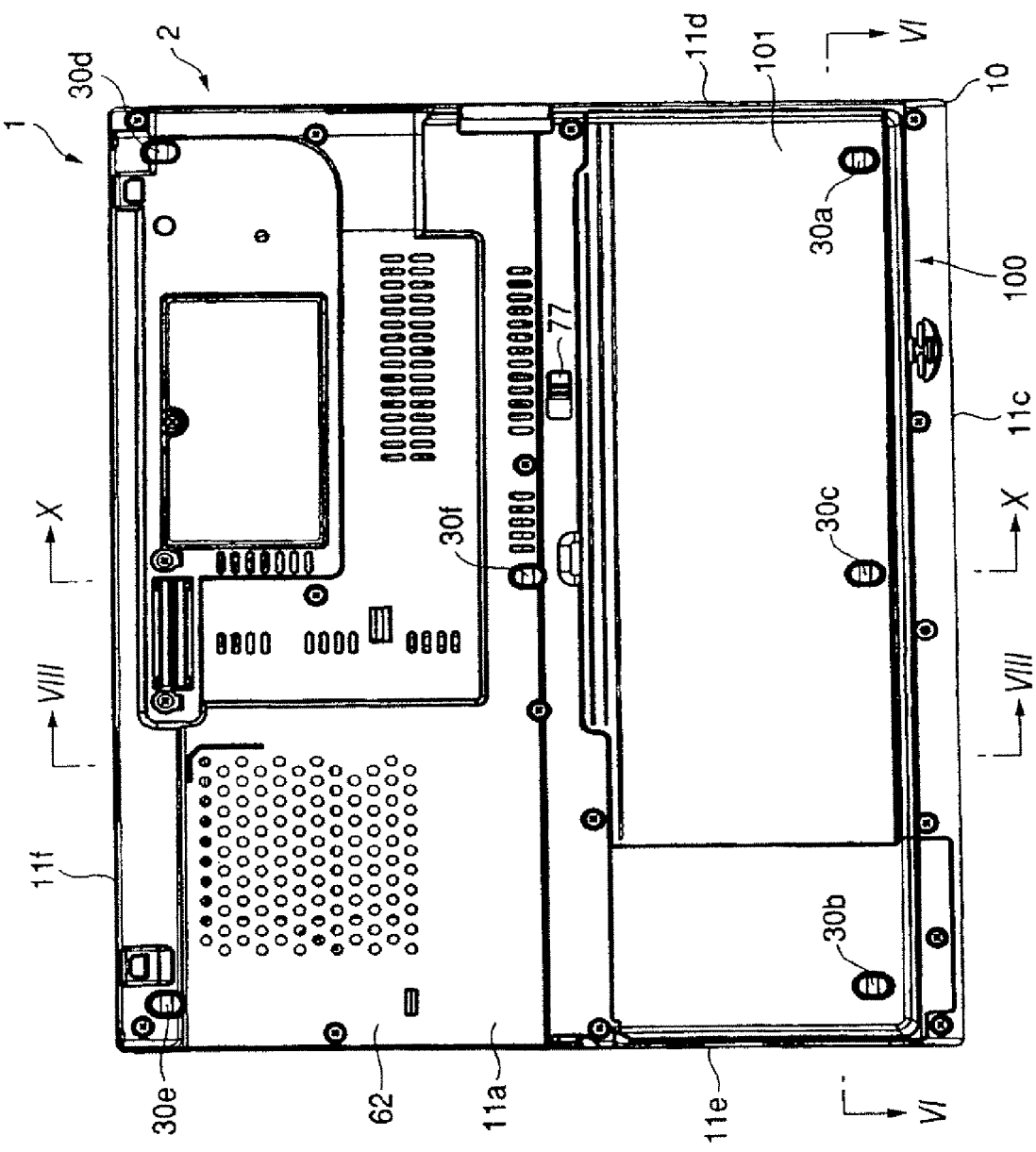
FIG. 5 is a front view showing a state in which the battery unit depicted in FIG. 2 has been mounted in the portable computer depicted in FIG. 1.

That is, as shown in FIGS. 2 and 5, in the outer surface of the bottom wall 11a of the first housing 10, a plurality of leg portions, e.g. three leg portions 30a to 30c are provided near to the front side while a plurality of leg portions, e.g. two leg portions 30d and 30e are provided near to the rear side. In addition, a leg portion 30f is provided approximately in the center of the outer surface of the bottom wall 11a of the first housing 10. As the front leg portion 30a to 30c, there are provided a pair of leg portions 30a and 30b disposed separately from each other in the widthwise direction and a leg portion 30c provided in the center between these leg portions 30a and 30b. The rear leg portions 30d and 30e are separate from each other in the widthwise direction. Among the three front leg portions 30a to 30c, the two leg portions 30a and 30c are provided in the casing 101 of the battery unit 100.

Figure 8:
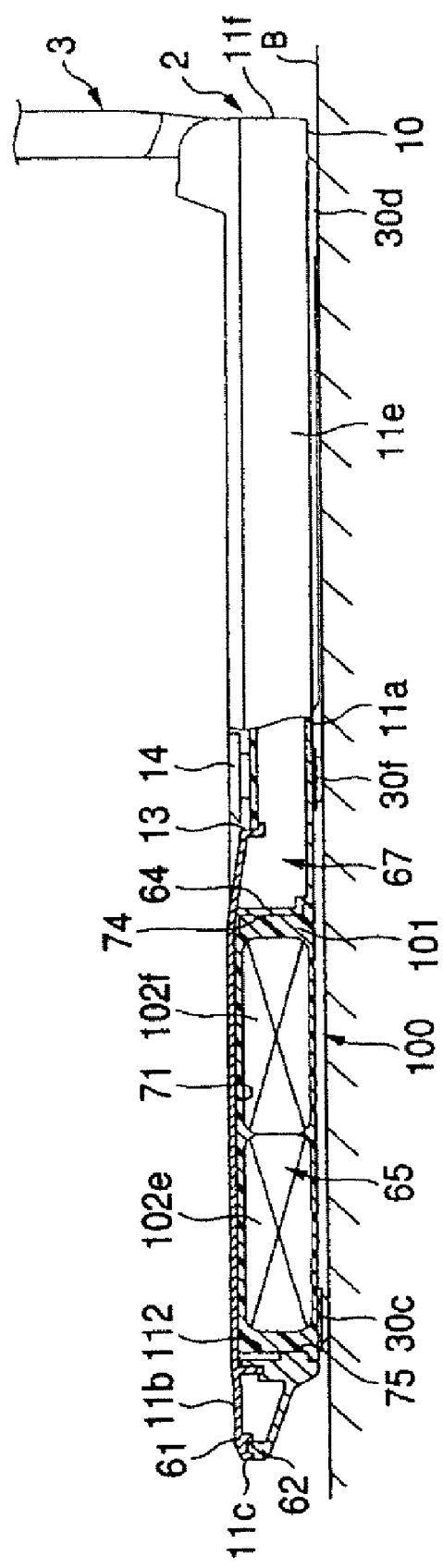
FIG. 8 is a sectional view taken along the line VIII-VIII in FIG. 5.
Figure 9:
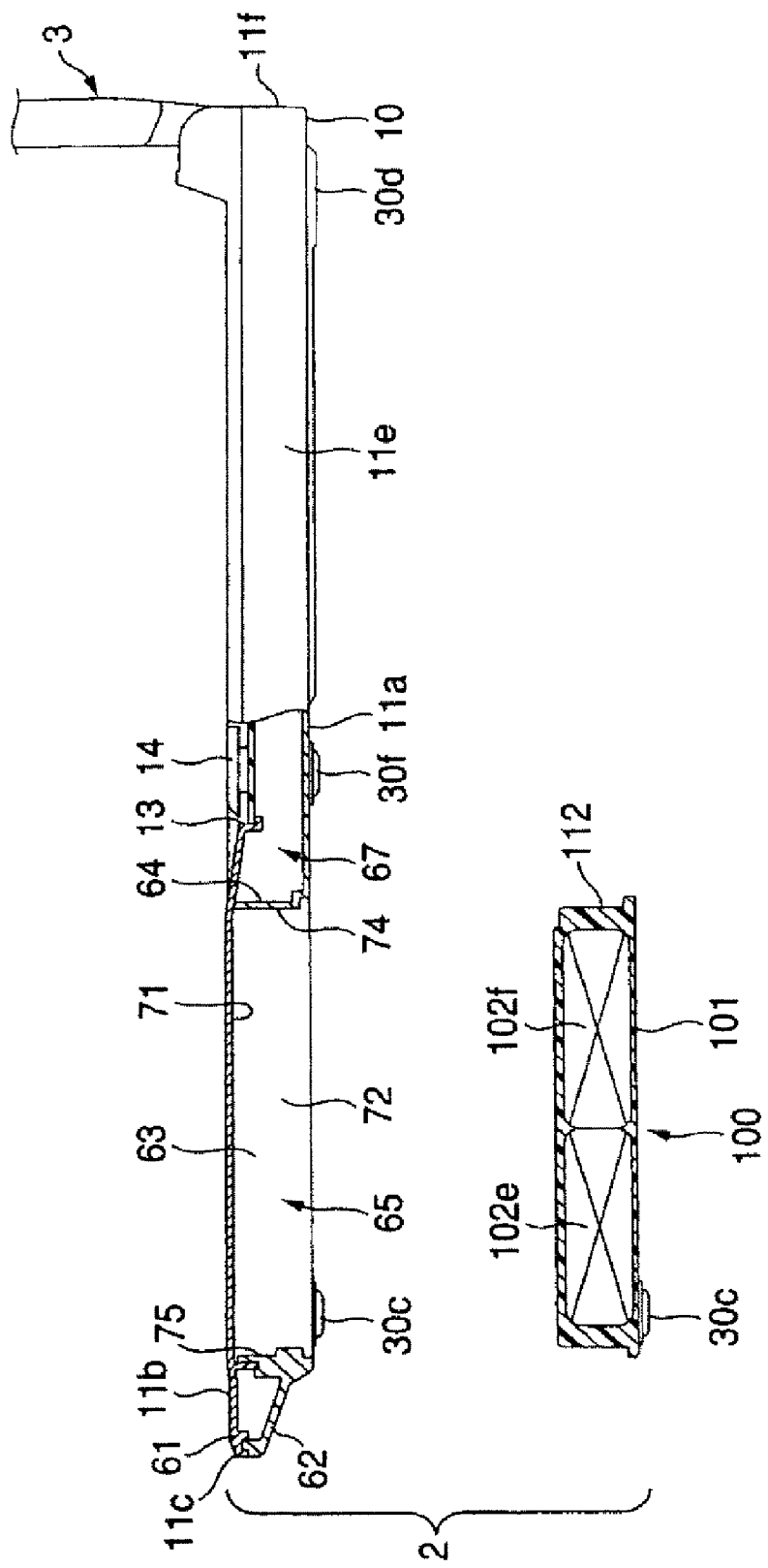
FIG. 9 is a sectional view like FIG. 8, showing a state in which the battery unit depicted in FIG. 2 has been removed from the portable computer depicted in FIG. 1.

With this configuration, when, for example, the portable computer 1 is placed on the worktop B of a desk, these leg portions 30a to 30f come into contact with the upper surface of the worktop B as shown in FIGS. 6, 8 and 10. Since the portable computer 1 has the three leg portions 30a to 30c on its front side, the portable computer 1 can be fixed stably on the worktop B even when the pointing device 40 provided in the central portion of the palm rest 12 is operated.

As described above, the battery unfit 100 according to this embodiment has the casing 101, and the plurality of battery cells 102a to 102f. The casing 101 has the first portion 111 for storing one or more battery cells 102a to 102d, the second portion 112 for storing one or more battery cells 112e and 112f, and the third portion 113 for connecting the first portion 111 and the second portion 112 to each other. The third portion 113 has the relief portion 115. With this configuration, reduction in thickness of the electronic apparatus can be achieved because the pointing device 40 and the pointing device support portion 68 are disposed at least partially in a space S formed by the relief portion 115 when the pointing device 40 and the pointing device support portion 68 are mounted in the first housing 10.

In other words, at least apart of the third portion 113 (having the thin portion 114) is formed to be thinner than each of the first and second portions 111 and 112. The thickness d2 of the thin portion 114 is smaller than the thickness d4 of each of the first and second portions 111 and 112 and smaller than the thickness d1 of each of the battery cells 102a to 102f. With this configuration, reduction in thickness of the electronic apparatus can be achieved because the pointing device 40 and the pointing device support portion 68 overlap with the thin portion 114 at least partially in the thickness direction of first housing 10 (the thickness direction of the battery unit 100) when the pointing device 40 and the pointing device support portion 68 are mounted in the first housing 10.

In other words, the third portion 113 has the recess portion 116. With this configuration, reduction in thickness of the electronic apparatus can be achieved because the pointing device 40 and the pointing device support portion 68 overlap with the recess portion 116 (the bottom 116a of the recess portion 116) at least partially when the pointing device 40 and the pointing device support portion 68 are mounted in the first housing 10.

As described above, according to this embodiment, it is possible to obtain a battery unit 100 which can achieve reduction in thickness of an electronic apparatus such as a portable computer 1 when the battery unit 100 is mounted in the electronic apparatus.

In addition, the battery unit 100 can obtain generally electric power in proportion to the total volume of the battery cells 102a to 102f. In the battery unit 100 according to this embodiment, the four battery cells 102a to 102d are arranged in two rows and two columns in the first portion 111, the two battery cells 102e and 102f are arranged in one row and two columns in the second portion 112, and these first and second portions 111 and 112 are electrically connected to each other. With this configuration, it is possible to obtain electric power equal to that of the background-art battery unit 100 having the so-called 3S 2P structure.

Moreover, when the battery unit 100 is divided into two, two connectors 105 and two power connectors 54 are provided. However, the battery unit 100 according to this embodiment is divided into the first portion 111 where the battery cells 102a to 102d are stored, and the second portion 112 where the battery cells 102e and 102f are stored, in the condition that the first and second portions 111 and 112 are electrically connected to each other. With this configuration, only one connector 105 and only one power connector 54 can be used.

Further, since the portable computer 1 is formed so that the battery unit 100 large in weight is provided near to the front side, the display unit 3 can be opened in a stable state when the portable computer 1 is rotated from the close position to the open position.

In addition, the printed-wiring board 52 is provided near to the rear where the connector 105 is provided. With this configuration, the circuit pattern can be simplified. In addition, the distance of propagation of a signal can be shortened, so that a signal inputted to the printed-wiring board 52 or a signal outputted from the printed-wiring board 52 can be transmitted rapidly.

With the advance of increase in processing speed and increase in number of functions of a CPU (not shown) provided in the printed-wiring board 52, the amount of heat generated during the operation of the CPU shows a tendency to increase. Since the amount of heat generated by the battery unit 100 is smaller than the amount of heat by the CPU, heat generated from the portable computer 1 gives little influence on the operation, etc. of the keyboard 14 even if the battery unit 100 is provided under the palm rest 12.

Although the description have been made on the case where the electronic component and the mechanical component overlap with the thin portion 114 at least partially in the thickness direction when the electronic component and the mechanical component are mounted in the first housing 10, the electronic component or the mechanical component may come into contact with the thin portion 114 or may be superposed on the thin portion 114 with a slight gap. As described in the embodiment, the pointing device 40 as the electronic component may be superposed on the thin portion 114 through a separate component such as the pointing device support device 68.

Similarly, although the description have been made on the case where the electronic component and the mechanical component overlap with the bottom 116a of the recess portion 116 at least partially when the electronic component and the mechanical component are mounted in the first housing 10, the electronic component or the mechanical component may come into contact with the bottom 116a of the recess portion 116 or may be superposed on the bottom 116a of the recess portion 116 with a slight gap. In addition, as described in the embodiment, the pointing device 40 as the electronic component may be superposed on the bottom 116a of the recess portion 116 through a separate component such as the pointing device support device 68.

The shape of each recess portion 116 as the relief portion 115, the number of recess portions 116 and (all or a part of) the places of the recess portions 116 may be determined desirably. The recess portion may be determined in accordance with the position where the electronic component or the mechanical component to be superposed will be mounted.

Figure 15:
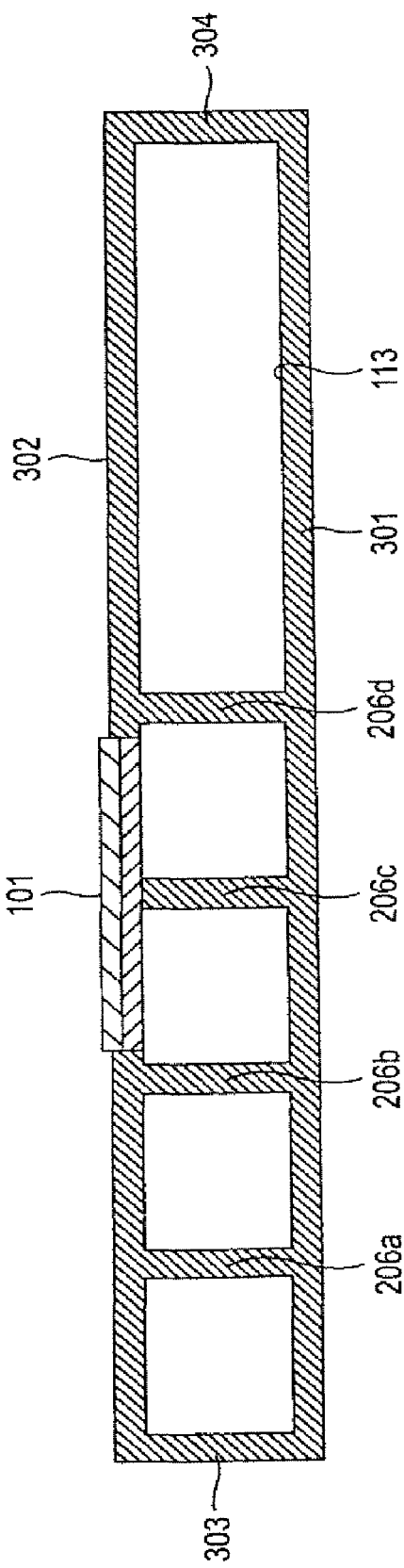
FIG. 15 is a sectional view taken along the line Y-Y in FIG. 14.
Figure 16:
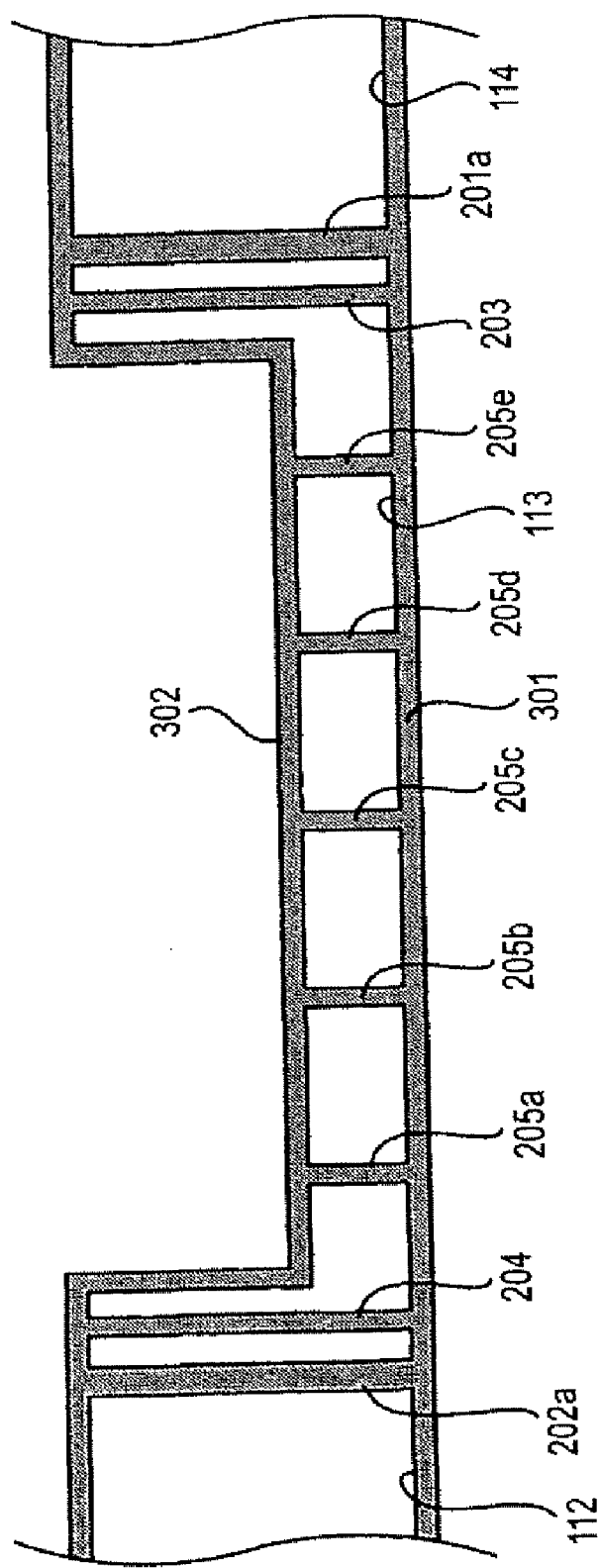
FIG. 16 is a sectional view taken along the line Z-Z in FIG. 14.

Next, reinforcement of the inside of the battery unit 100 will be described. As described above, the battery unit 100 has the first and second portions 111 and 112 for storing the battery cells 102a to 102f, and the third portion 113 for connecting the first and second portions 111 and 112 to each other. Since the thickness of the third portion 113 is smaller than that of each of the first and second portions 111 and 112, strength in the boundary between the third portion 113 and the first portion 111 and in the boundary between the third portion 113 and the second portion 112 is weakened. Therefore, as shown in FIGS. 14, 15 and 16, reinforcing ribs which will be described later are built in the third portion 113 to ensure the rigidity of the battery unit 100.

Figure 14:
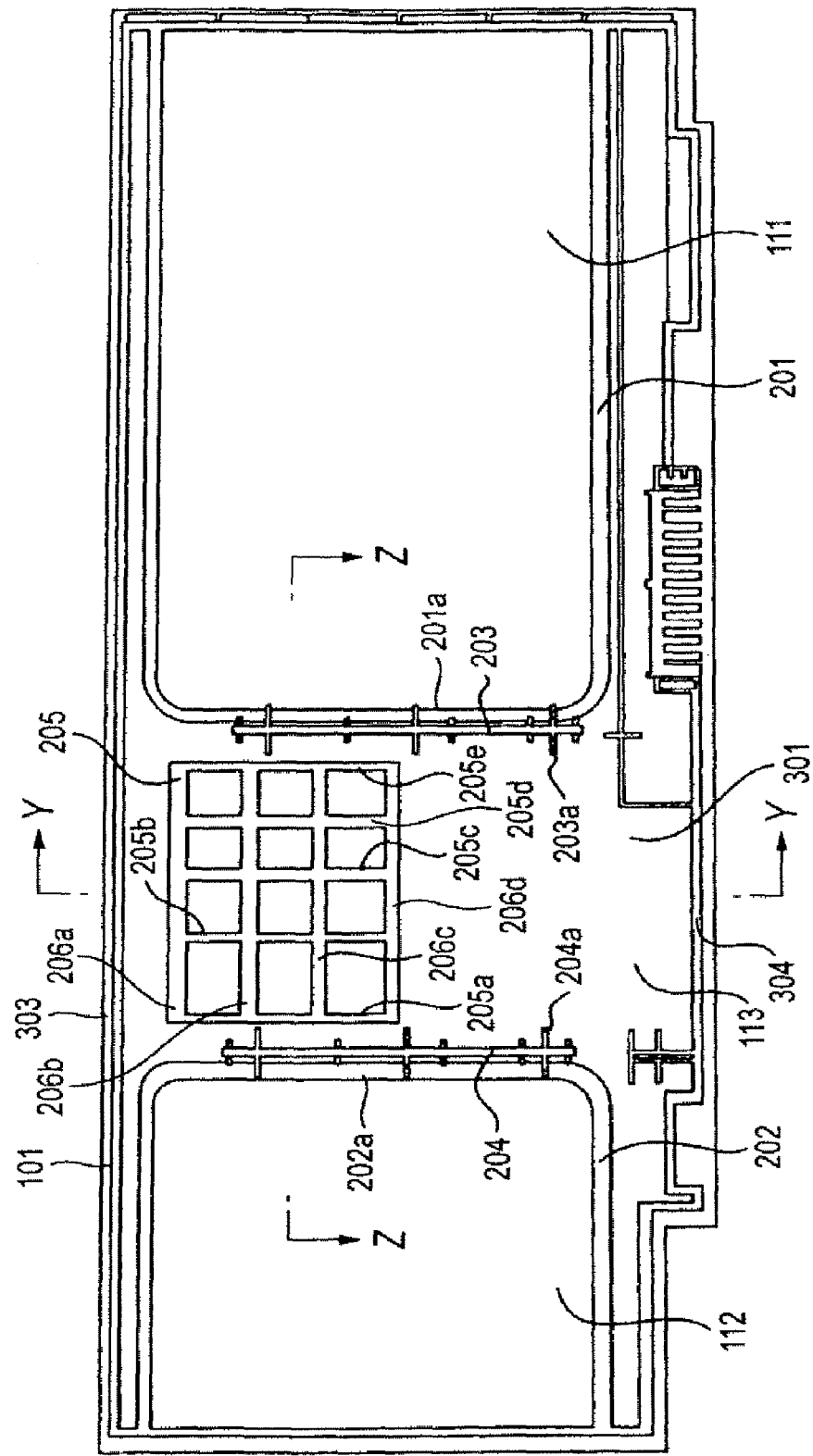
FIG. 14 is a plane view showing a state of the battery unit after the upper wall of the battery unit, the battery cells and other components have been removed.

FIG. 14 is a plan view showing the state where the upper wall of the battery unit, the battery cells and other components have been removed. The casing 101 of the battery unit 100 has a side wall 200 for forming a side wall of the battery unit 100. A rising wall 201 for defining the first portion 111 and a rising wall 202 for defining the second portion 112 are provided in the inside of the side wall 200. The rising wall 201 for defining the first portion 111 has a wall portion 201a. The rising wall 202 for defining the second portion 112 has a wall portion 202a. The wall portion 201a and the wall portion 202a face each other.

Reinforcing ribs 203 and 204 are provided on sides of the wall portions 201a and 202a facing each other so that the reinforcing ribs 203 and 204 protrude from the casing 101. The rib 203 is provided along the wall portion 201a. The rib 204 is provided along the wall portion 202a. The ribs 203 and 204 also face each other. In order to reinforce the rib 203 (204) reinforcing ribs 203a (204a) extending in a direction perpendicular to the rib 203 (204) are provided integrally with the rib 203 (204) at intervals of a pitch.

The third portion 113 is located between the ribs 203 and 204. A lattice shaped reinforcing rib 205 is provided in the third portion 113. The reinforcing rib 205 is also formed integrally with the casing 101 in the same manner as the ribs 203 and 204. The reinforcing rib 205 has a plurality of ribs 205a to 205e extending along the minor axis of the casing 101, and a plurality of ribs 206a to 206d extending along the major axis of the casing 101.

FIG. 15 is a sectional view taken along the line Y-Y in FIG. 14. The casing 101 has a lower wall 301, an upper wall 302, and side walls 303 and 304 for connecting the lower 301 and the upper wall 302 to each other. The plurality of ribs 206a to 206d in the rib 205 are formed so as to extend between the lower wall 301 and the upper wall 302. Thus, the ribs 206a to 206d are formed to strengthen the rigidity of the casing 101 in the third portion 113.

FIG. 16 is a sectional view taken along the line Z-Z in FIG. 14. As shown in FIG. 16, the plurality of ribs 205a to 205e in the rib 205 are provided in the third portion 113 so as to extend between the lower wall 301 and the upper wall 302. The ribs 203 and 204 facing the wall portions 201a and 202a are provided to extend between the lower wall 301 and the upper wall 302 in the same manner as the rib 205. With this configuration, the rigidity of the casing 101 can be enhanced even if the third portion 113 is formed to be thinner than each of the first and second portions 111 and 112 in the condition that the third portion 113 is provided between the first portion 111 and the second portion 112.

Incidentally, the electronic apparatus in which the battery unit can be mounted is not limited to the portable computer 1. The battery unit can be applied broadly to various kinds of electronic apparatuses such as an electronic organizer, a PDA, etc.

The electronic component is not limited to a pointing device such as a touch panel. Examples of the electronic component may include a keyboard, an HDD, a DVD, a PC card, a PC card slot, a memory card slot, an expanded memory, an LAN module, a wireless module, a pen having a coil, etc. and provided for inputting a signal to the pointing device such as a touch panel by electrostatic induction, a printed-wiring board, a connector panel, etc. When such an electronic component is mounted in the housing, at least a part of the electronic component is provided in the space which is formed by the relief portion of the battery unit. Thus, reduction a in thickness of the electronic apparatus can be achieved.

The mechanical component is not limited to the pointing device support portion or a pen for applying pressure to the pointing device such as a touch panel. Examples of the mechanical component may include a hinge, a hinge device, etc. When such a mechanical component is mounted in the housing, at least a part of the mechanical component is provided in the space formed by the relief portion of the battery unit. Thus, reduction in thickness of the electronic apparatus can be achieved.

Any battery unit may be used as long as the battery unit has the first portion for storing one or more battery cells, the second portion for storing one or more battery cells, and the third portion having the relief portion and for connecting the first and second portions to each other. The external shape of the battery unit and the external shape of each battery cell may be determined desirably.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a housing including a bottom wall, a top wall and a plurality of walls coupled to the bottom wall and the top wall surrounding a periphery of the housing, the top wall including a palm rest portion situated toward a front wall of the plurality of walls;
a pointing device partially exposed on the palm rest portion of the top wall; and
a battery unit positioned to form a part of the bottom wall of the housing, the battery unit including
a plurality of battery cells, and
a casing having an upper surface and a lower surface, the casing comprising
a first portion storing a battery cell, the first portion being formed by a first section of the upper surface and the lower surface of the casing,
a second portion storing a battery cell, the second portion being formed by a second section the upper surface and the lower surface of the casing, and
a third portion arranged between the first portion and the second portion and formed by a recessed portion of the upper surface and the lower surface to overlap a portion of the pointing device, a distance between the recessed portion of the upper surface and the lower surface is less than a distance between either the first section or the second section of the upper surface and the lower surface, the third portion including a first rib arranged between the upper surface and the lower surface.

2. The electronic apparatus of claim 1, wherein the battery unit further comprising:
a plurality of second ribs; and
wherein the first portion has a first wall forming a first boundary between the first portion of the casing and the third portion of the casing, the second portion has a second wall facing to the first wall to form a second boundary between the third portion of the casing and the second portion of the case, the second ribs formed along portions of the first boundary and the second boundary and facing each other.

3. The electronic apparatus of claim 2, wherein the third portion of the casing of the battery unit is arranged between the plurality of second ribs.

4. The electronic apparatus of claim 1, wherein the first rib within the third portion of the casing is lattice-shape.

5. The electronic apparatus of claim 1 further comprising a display unit that is rotational for placement in a first position where the display unit is configured to lay horizontally on the housing so as to cover the palm rest portion of the top wall and in a second position where the display unit is configured to be substantially erect and expose the palm rest portion.

6. The electronic apparatus of claim 5 further comprising a keyboard positioned adjacent to a rear side of the palm rest portion, the rear side of the palm rest portion being further away from the front wall of the housing than a front side of the palm rest portion.

7. An electronic apparatus comprising:
a body unit including a housing, the housing including a bottom wall and a top wall that includes a palm rest portion situated toward a front side of the housing;
a display unit rotationally coupled to the body unit, the display unit to lay horizontally on the housing so as to cover the palm rest portion of the top wall when the display unit is placed in a first position and the display unit being raised to expose the palm rest portion of the top wall when the display unit is placed in a second position;
a pointing device situated within the palm rest portion of the top wall; and
a battery unit positioned to form a part of the bottom wall of the housing, the battery unit including a casing having an upper surface and a lower surface, the casing comprises
a first portion to store a first battery cell, the first portion being formed by a first section of the upper surface and the lower surface of the casing,
a second portion to store a second battery cell, the second portion being formed by a second section the upper surface and the lower surface of the casing, and
a third portion positioned between the first portion and the second portion and formed by a recessed portion within at least one of the upper surface and the lower surface, the third portion being positioned under and overlapping the pointing device so that a distance between the recessed portion of the upper surface and the lower surface is less than a distance between either the first section or the second section of the upper surface and the lower surface, the third portion including a first rib arranged between the upper surface and the lower surface of the casing.

8. The electronic apparatus of claim 7, wherein the battery unit further comprising:
a plurality of second ribs; and
wherein the first portion has a first wall forming a first boundary between the first portion of the casing and the third portion of the casing, the second portion has a second wall facing to the first wall to form a second boundary between the third portion of the casing and the second portion of the case, the second ribs formed along portions of the first boundary and the second boundary and facing each other.

9. The electronic apparatus of claim 8, wherein the third portion of the casing of the battery unit is arranged between the plurality of second ribs.

10. The electronic apparatus of claim 7, wherein the first rib within the third portion of the casing is lattice-shape.

11. The electronic apparatus of claim 7 further comprising a keyboard positioned adjacent to a rear side of the palm rest portion, the rear side of the palm rest portion being further away from the front side of the housing than a front side of the palm rest portion.

12. The electronic apparatus of claim 7 wherein the third portion of the casing of the battery unit excludes any battery cells and includes wiring for electrically connecting the first battery cell stored within the first portion with the second battery cell stored in the second portion.

13. The electronic apparatus of claim 12 wherein the battery unit further comprising a circuit board electrically coupling to the first battery cell of the first portion with the second battery cell of the second portion.

14. The electronic apparatus of claim 13 wherein the circuit board is situated within the first portion of the casing of the battery unit.

15. The electronic apparatus of claim 7, wherein the battery unit further comprises:
   a connector; and
   a circuit board electrically coupled to (i) the connector, (ii) the first battery cell stored within the first portion of the casing, and (iii) the second battery cell stored within the second portion of the casing.

16. An electronic apparatus comprising:
   a body unit including a housing, the housing including a bottom wall, a top wall, a front wall, a rear wall and at least two side walls;
   a pointing device situated within the body unit closer to the front wall than the rear wall; and
   a battery unit positioned to form a part of the bottom wall of the housing, the battery unit including a casing having an upper surface and a lower surface, the casing comprises
   a first portion formed by a first section of the upper surface and the lower surface of the casing, the first portion to store a first battery cell,
   a second portion formed by a second section the upper surface and the lower surface of the casing, the second portion to store a second battery cell, and
   a third portion positioned between the first portion and the second portion and formed by a recessed portion within the upper surface of the casing so that the recessed portion conforms to a portion of the pointing device protruding down toward the bottom wall, the third portion including a first rib arranged between the upper surface and the lower surface.

17. The electronic apparatus of claim 16 further comprising a display unit rotationally coupled to the body unit, the display unit to lay horizontally on the top wall of the housing so as to cover the pointing device when the display unit is placed in a first position and the display unit being raised to expose the pointing device when the display unit is placed in a second position.

* * * * *